Nov. 16, 1948.  B. ULINSKI  2,453,949
MANUALLY CONTROLLED POWER BOOSTER MECHANISM
Filed May 12, 1945  2 Sheets-Sheet 1
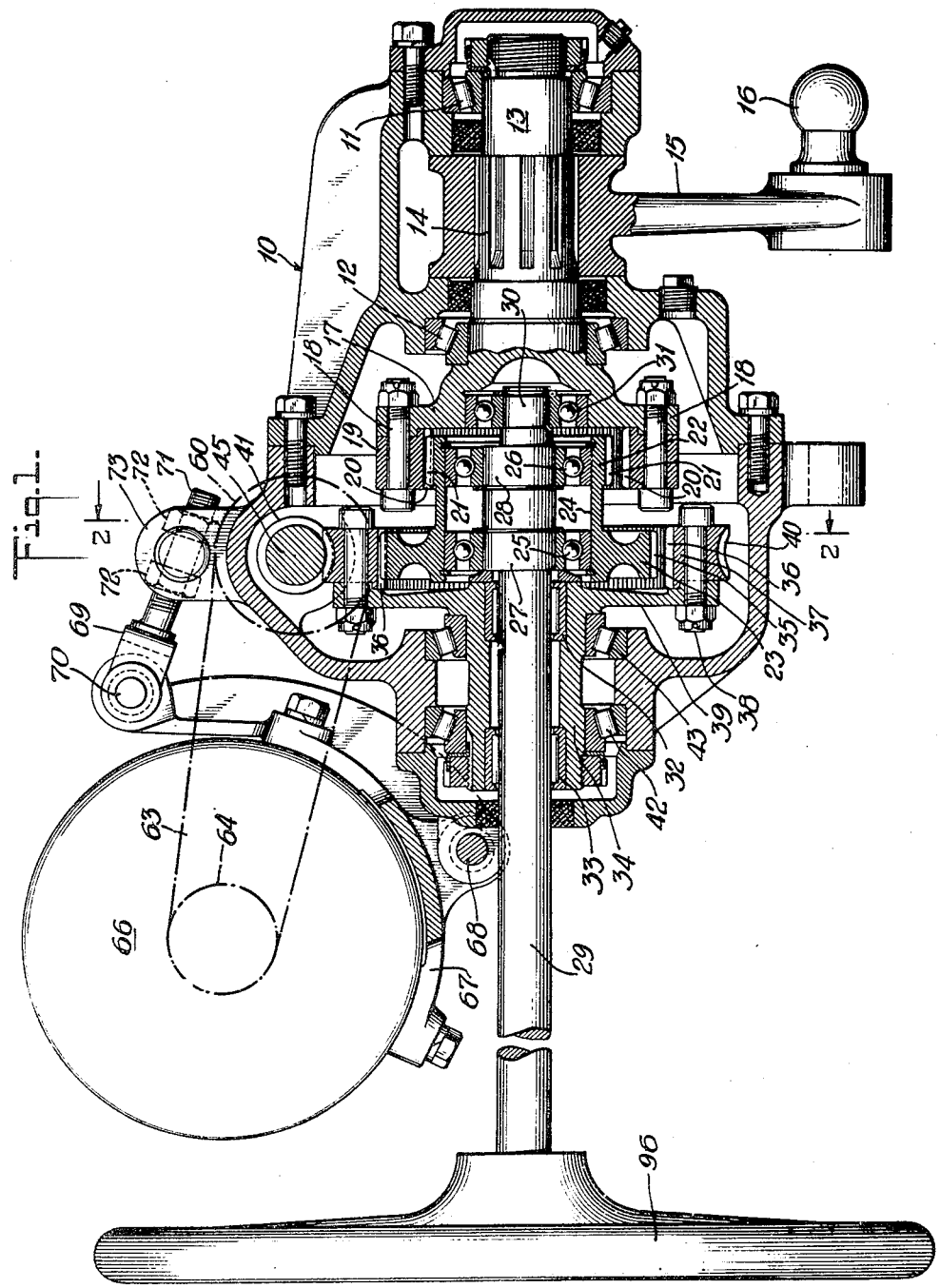
INVENTOR
B. Ulinski
BY A. H. Holden
ATTORNEY

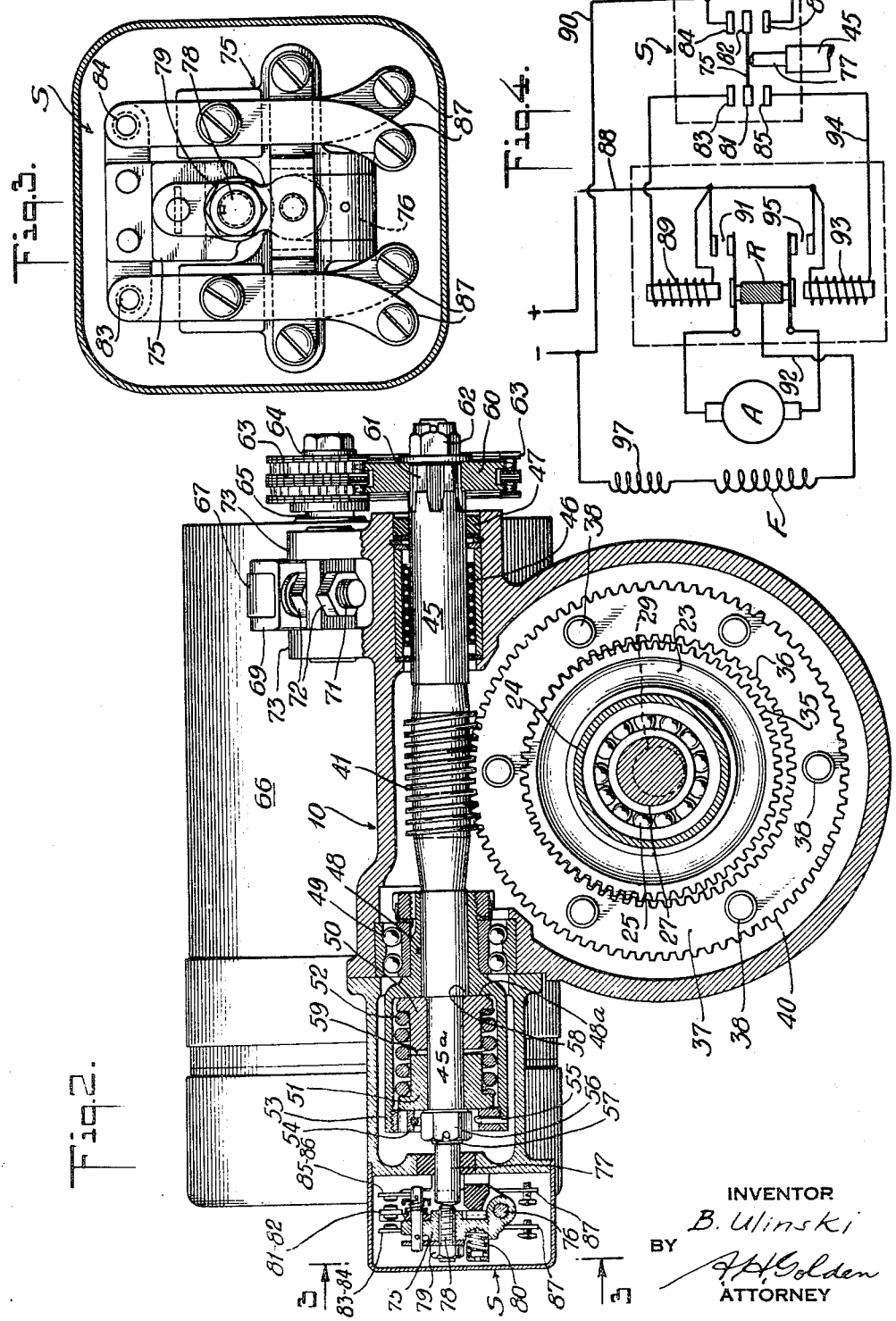

Patented Nov. 16, 1948

2,453,949

UNITED STATES PATENT OFFICE 2,453,949

MANUALLY CONTROLLED POWER BOOSTER MECHANISM

Bronislaus Ulinski, Chicago, Ill., assignor to The Yale & Towne Manufacturing Company, Stamford, Conn., a corporation of Connecticut Application May 12, 1945, Serial No. 593,389

17 Claims. (Cl. 180—79.1)

1

This invention relates to a booster mechanism, and more particularly to a booster mechanism adapted for use in a steering assembly.

Steering assemblies having booster mechanisms are generally formed so that when there is very little resistance to the movement of the steering wheels, as when the vehicle is moving at considerable speed over a smooth road, the booster mechanism does not come into play. In other words, the vehicle steering apparatus is actuated manually by the steering wheel.

However, when the vehicle is standing still, and considerable effort is required to move the steering apparatus, a spring or other pressure actuated mechanism that is positioned intermediate the steering wheel and the steering apparatus, closes an electric circuit or otherwise energizes a booster motor. It is to this type of steering assembly to which my invention relates.

In steering assemblies of the particular type set forth, the motor mechanism, once actuated, tends to overrun. This is especially the characteristic of steering assemblies in which the booster motor is electric and is directly geared into the steering assembly. Therefore, the path of the vehicle is naturally wavy because the steering is first in one direction and then in the opposite direction. It is the object of my invention to contribute to the art a steering assembly of the booster type in which there can be no undesired operation of the steering mechanism because of the overrunning of a motor.

As a feature of my invention I provide a motor operated booster in which means are provided for rendering ineffective the motor actuated apparatus even though the motor itself remains running. More in detail, if an electric motor is utlized, means are provided for stopping the movement of the steering mechanism even though the motor remains energized. It is a further feature of this part of my invention that I am able to use positive drive means and require no clutches or other similar mechanisms.

As a further feature of my invention the steering apparatus is arranged for manual operation in the event that the motor booster mechanism is out of order, or is otherwise inoperative. As still a further feature of my invention, a manually operated steering wheel is utilized to control not only the drive by the booster motor, but also the electric circuit of the booster motor where an electric motor is utilized.

I have thus outlined the more important features of my invention in order that my contribution to the art may be better understood and in order that the relation of my contribution to the prior art may be better comprehended. Also, while I have described generally several important features of my invention, there are other important features that will be described more particularly in the specification and will be claimed in the claims appended hereto.

At this point it will be well to add also, that while my invention is particularly adapted for use in a steering assembly, it is also adapted for use in other mechanisms where a control member functions to control the movement of a controlled apparatus by a motor.

Referring now to the drawings, Fig. 1 is a vertical section of a steering assembly in which my invention is embodied, the assembly being of the type that may be best utilized in an electric industrial truck.

Fig. 2 is a section taken along lines 2—2 of Fig. 1.

Fig. 3 is a section taken along lines 3—3 of Fig. 2.

Fig. 4 is a wiring diagram of my invention.

Referring now more particularly to the drawings, reference numeral 10 indicates generally a casing formed of a series of castings held together by bolts in a manner that is well understood in this art. Through roller bearings 11 and 12, there is rotatably mounted within the casing 10 a steering actuator shaft 13. This actuator shaft 13 has splined thereto at 14 a steering arm 15 having the usual steering ball 16 for steering operation in a well known manner.

Looking at Fig. 1, the left end of the steering actuator shaft 13 is formed with a circular flange 17, and bolted to this flange 17 by a series of bolts 18, is an internal ring gear 19. The teeth of the internal ring gear 19 are designated by reference numeral 20 and are in engagement with the teeth 21 of a spur gear 22. Spur gear 22 is integral with a spur gear 23, the two being connected by an integral sleeve portion 24. Spur gear 23 and spur gear 22, together with the integral sleeve 24, are adapted for rotation on ball bearings 25 and 26 relatively to circular cams 27 and 28 formed integrally with a steering shaft 29, but eccentric relatively to the axis of rotation of said shaft. While cams 27 and 28 are shown in spaced relation, they are actually of the same contour and are, in effect, a single cam.

The steering shaft 29 has a bearing portion 30 at its right hand end, as seen in Fig. 1 adapted for rotation relatively to the flange 17 by means of a ball bearing 31. The central portion of the shaft 29 is suitably supported by needle bearings 32 and 33 that in turn bear on a sleeve 34.

Referring back once again to the spur gear 23 that is formed integrally with the spur gear 22, the teeth 35 of said spur gear 23 are in mesh with the teeth 36 of an internal ring gear 37. The ring gear 37 is secured by a series of bolts 38 to a flange 39 formed on the sleeve 34 already referred to. The outer surface of the ring gear 37 is formed as a worm gear 40 and in mesh with the teeth thereof is a worm 41 best illustrated in Fig. 2. It will be well at this point to indicate that the sleeve 34 to which the ring gear 37, and therefore worm gear 40 are secured, is mounted for rotation on the casing 10 through the intermediary of roller bearings 42 and 43.

Referring more particularly to Fig. 2, the worm 41 is formed as a part of a shaft 45. This shaft 45 is rotatably mounted at its right end relatively to the casing 10 through the intermediary of a sliding ball bearing assembly 46, a suitable stuffing box being provided and designated by reference numeral 47. It will be well to indicate now, that in accordance with the usual practice, suitable stuffing boxes, ball bearing retainers, drain and lubricating plugs, etc., are used in my structure and are shown in the drawings, but are not described here because they are the usual means that will be provided by skilled engineers. The left hand end of the shaft 45 as seen in Fig. 2 is mounted for rotation and sliding on the casing 10 through the intermediary of a sleeve 48 that is supported by ball bearings 49 for rotation on said casing 10.

While shaft 45 is thus adapted to slide relatively to the casing 10 and the sleeve 48, it is held against such sliding action by means now to be described. Portion 45a of the shaft 45 has mounted thereon a shouldered collar 50 and a further shouldered collar 51 pressed in opposite directions by a spring 52. The two collars and the spring 52 are retained within the enlarged sleeve portion 53 forming an integral part of the sleeve 48 on which the left hand end of the shaft 45 is supported for sliding and rotary movement. The left hand end of the enlarged sleeve 53 is closed by a nut 54 that is pinned at 55 thereto. A nut 56 is mounted on threads 57 cut on the shaft 45, and in juxtaposed relation to collar 51 with the said collar pressed against it. The shoulder of the collar 51 is also positioned against the rear surface of the nut 54 and closing sleeve 48. The collar 50 bears at 58 against a shoulder of the shaft 45 defining the part 45a of the said shaft, and also bears with its surface 48a against the shoulder between sleeve 48 and its enlarged sleeve portion 53.

It is obvious that in the position of the parts in Fig. 2, the shaft 45 will be held in a balanced position by the spring 52 and the collars 50, 51. Any tendency of the shaft to move to the left will cause the shoulder of the shaft to bear at 58 against the collar 50 and move that collar to the left against the resistance of the spring 52. This movement will be limited to the space 59 between the collars 50 and 51, but will be sufficient for the purpose to be hereinafter set forth. Movement of the shaft 45 to the right in Fig. 2, will cause the nut 56 to move the collar 51 to the right against the force of spring 52. This movement will also be limited to the space 59 as already set forth.

The shaft 45 has secured at its right hand end a sprocket 60 splined thereto at 61 and held in position by a nut 62. The sprocket 60 is actuated by a sprocket chain 63 that is driven by a sprocket 64 fixed to the end of a shaft 65 of an electric motor 66. Those skilled in the art will appreciate that the chain 63 will drive the sprocket 60 in all longitudinal positions of that sprocket incidental to its movement with the shaft 45.

For adjusting the tension of the sprocket chain 63, the motor 66 is supported by a bracket 67 that is pivoted at 68 to the casing 10. A link 69 is pivoted at 70 to the bracket 67 and is threaded at 71 for cooperation with adjusting nuts 72, These adjusting nuts secure the link 69 in any one of several adjusted positions relatively to an ear 73 of the casing 10 in a manner which will be appreciated by those skilled in the art. This part of the mechanism shown by me is not claimed as my invention and it is thought that no further description thereof is necessary.

Endwise movement of the shaft 45 on which is formed the worm 41, is adapted to effect the operation of switch mechanism designated generally by reference letter S in Figs. 2 and 3. This switch mechanism comprises an arm 75 pivoted at 76 and adapted for pivotal movement by the relatively small end 77 of the shaft 45. An adjustable bolt 78 is threaded into the arm 75, and is held in an adjusted position by the nut 79 so that when the end of the bolt 78 is in contact with the end 77 of the shaft 45 in the normal balanced position of that shaft, the arm 75 will be in a neutral position. A spring 80 normally presses the arm 75 against the end 77 of the shaft 45 so that the arm may follow the movement of the shaft 45 when it moves to the right from its balanced position of Fig. 2.

The arm 75 carries opposed contacts 81, 82 for cooperation with fixed contacts 83, 84, 85 and 86 that are mounted at the ends of contact carrying bars 87 shown diagrammatically in Fig. 4 and mechanically in Figs. 2 and 3. The particular construction of the switch mechanism S is of no importance in this invention, since any other type of structure that would yield the same results may be utilized. It is merely important that when the arm 75 moves in a clockwise or counterclockwise direction on its mounting 76 incidental to the movement of shaft 45, it closes the circuit of the motor 66 so as to actuate that motor in a forward or reverse direction. This circuit closing action will take place, of course, when the contacts 81, 82 are brought into contact with stationary contacts 83, 84 or stationary contacts 85, 86, all as illustrated in Fig. 4. In that figure, reference numeral 97 indicates the brake operating coil of the motor 66, while the field of that motor is indicated by the letter F and the armature by the letter A.

If we now consider the shaft 45 as moving to the left in Fig. 2 and upwardly in Fig. 4, its portion 77 will effect a movement of the arm 75 and its contacts 81, 82 into bridging relation to contacts 83, 84. A circuit will then be closed as follows: From the plus side of the line through conductor 88, contactor coil 89, contacts 83, 81 and 82, 84, conductor 90 to the negative side. The energizing of the contactor coil 89 will close a circuit at contacts 91 so that current will flow from the plus side of the line through conductor 88, the contacts 91, armature A, a portion of a resistance R, conductor 92, field F and brake coil 97 to the negative side of the line. This will release the brake and simultaneously effect a rotation of the motor 66 in a particular desired direction.

Assuming now that the shaft 45 moves to the right in Fig. 2 and downwardly in Fig. 4, the portion 77 will allow the arm 75 to move under the influence of its spring 80 so as to bring the contacts 81, 82 into bridging relation relatively to contacts 85, 86. This will effect the closing of a circuit from the plus side of the line through conductor 88, contactor coil 93, conductor 94, contacts 85, 81 and contacts 82, 86, thence conductor 90 to the negative side of the line. The energizing of the contactor coil 93 will bring together the contacts at 95 so as to close a circuit from the plus side of the line, the contacts at 95, armature A, a portion of the resistance R, conductor 92, field F and brake coil 97. It will be observed that the flow of the current in the armature A is now in a direction reverse to that first described, and that the rotation of the motor 66 will therefore be in a reverse direction.

I shall now describe the operation of my invention. In epicyclic gearing of the type used by me in the casing 10, the rotation of the eccentric cams 27, 28 on shaft 29 will effect a movement of the gears 23 and 22 that will bring about the rotation of the ring gear 19 when the ring gear 37 is maintained against rotation. Those skilled in the art will fully appreciate that if the motor 66 is inoperative, the worm gear 40 will be held against rotation by the worm 41, and that this will of course hold the ring gear 37 against rotation. Therefore, it will be possible at all times to rotate the steering shaft 29 through steering wheel 96 and thereby effect a movement of the eccentric cams 27, 28 and a rotation of the ring gear 19. The movement of ring gear 19 by shaft 29 will of course be in a ratio that will be determined by the number of teeth used on the spur and ring gears of the epicyclic gearing, all of which those skilled in the art will fully understand. Naturally, rotation of the ring gear 19 will effect a rotation of the steering actuator shaft 13 and steering movement of the arm 15. It may therefore be said that at all times the steering wheel 96 will be operative to steer the truck manually.

Let us now consider that the motor 66 is operative. It will, of course, be readily appreciated that rotation of the steering shaft by wheel 96 will, under all circumstances, tend to rotate the ring gear 37 and its integral worm gear 40, since the ring gear 19 may act as the reaction member of the epicyclic gearing. This tendency of the ring gear 37 and its worm gear 40 to rotate, will of course be resisted by the worm 41 on shaft 45. Therefore, depending upon the direction of rotation of the steering shaft 29, the worm shaft 45 will move to the right or to the left in Fig. 2 against the resistance of spring 52. It has already been indicated that such movement will effect a closing of the circuit of the motor 66 to rotate the motor in one or the other direction. The motor will be energized so long as the shaft 29 is maintained by the steering wheel 96 in pressure relation to the ring gear 37 and the worm gear 40 through the intermediary of the eccentric cams 27, 28. Therefore, the motor will rotate the shaft 45 and worm gear 40 so as to impart rotation to the spur gears 23, 22 and a consequent rotation of the ring gear 19 so as to move the steering arm 15.

During this operation, the torque reaction of the entire epicyclic gearing system will be accepted by the cams 27, 28 and the steering shaft 29, and so long as the cams 27, 28 accept this reaction, the motor 66 will be operative and the gearing will be effective to steer the truck. Should the driver relieve his pressure on the steering wheel 96 so that the shaft 29, through its eccentric cams 27, 28 no longer accepts the steering torque reaction of the epicyclic gearing, the entire gear system will be ineffective to rotate the ring gear 19, all as is inherent in a system of this sort. This will be true even though the motor 66 remains excited. Of course, as I have already indicated, the relieving of the pressure maintained through the eccentric cams 27, 28 will allow the movement of the worm shaft 45 to its central balanced position of Fig. 2 so that the motor circuit will be broken. Therefore, it will be seen that the relieving of the pressure on the steering wheel will not only render the epicyclic gearing ineffective to actuate the steering mechanism, but will also stop the operation of the motor.

Because of the particular arrangement it will be seen at once that, even should the motor overrun, there can be no oversteering because the transmission between the motor and the steering arm is rendered ineffective immediately upon the relieving of the pressure by steering wheel 96.

I believe that the invention and its operation will now be quite apparent to those skilled in the art.

I now claim:

1. In a combination of the class described, an epicyclic gear combination comprising a pair of independently rotatable internal ring gears and a pair of spur gears rotatable as a unit relatively to said ring gears, a control shaft having an eccentric cam on which said pair of spur gears are rotatably mounted, controlled mechanism secured relatively to one of said ring gears for actuation thereby, transmission means holding the other of said ring gears against rotation whereby the rotation of said eccentric cam rotates said first ring gear through said spur gears to actuate said controlled mechanism, and motor means for driving said transmission means energized by movement of said eccentric cam.

2. In a combination of the class described, an epicyclic gear combination comprising a pair of independently rotatable internal ring gears and a pair of spur gears rotatable as a unit relatively to said ring gears, a steering shaft having an eccentric cam on which said pair of spur gears are rotatably mounted, steering mechanism secured relatively to one of said ring gears for actuation thereby, and a motor for rotating the other of said ring gears whereby to rotate the first ring gear through said spur gears when said shaft is held to accept the driving torque reaction through said eccentric cam.

3. In a combination of the class described, an epicyclic gear combination comprising a pair of independently rotatable internal ring gears and a pair of spur gears rotatable as a unit relatively to said ring gears, a control shaft having an eccentric cam on which said pair of spur gears are rotatably mounted, controlled mechanism secured relatively to one of said ring gears for actuation thereby, a motor for rotating the other of said ring gears whereby to rotate the first ring gear through said spur gears when said shaft is held to accept the driving torque reaction through said eccentric cam, and a switch for said motor actuated by movement of said control shaft.

4. In a combination of the class described, an epicyclic gear combination comprising a pair of independently rotatable internal ring gears and a pair of spur gears rotatable as a unit relatively to said ring gears, a steering shaft having an eccentric cam on which said pair of spur gears are rotatably mounted, steering mechanism secured relatively to one of said ring gears for actuation thereby, a motor for rotating the other of said ring gears whereby to rotate the first ring gear through said spur gears when said shaft is held to accept the driving torque reaction through said eccentric cam, and a switch for said motor operable incidental to the acceptance of the torque reaction by said steering shaft.

5. In a combination of the class described, an epicyclic gear combination comprising a pair of independently rotatable internal ring gears and a pair of spur gears rotatable as a unit relatively to said ring gears, a control shaft having an eccentric cam on which said pair of spur gears are rotatably mounted, controlled mechanism secured relatively to one of said ring gears for actuation thereby, a motor for rotating the other of said ring gears whereby to rotate the first ring gear through said spur gears when said shaft is held to accept the driving torque reaction through said eccentric cam, and a switch for said motor operable incidental to the acceptance of the torque reaction by said control shaft.

6. In a combination of the class described, an epicyclic gear combination comprising a pair of independently rotatable internal ring gears and a pair of spur gears rotatable as a unit relatively to said ring gears, a steering shaft having an eccentric cam on which said pair of spur gears are rotatably mounted, steering mechanism secured relatively to one of said ring gears for actuation thereby, a motor, a drive transmission between said motor and the other of said ring gears for rotating the said ring gear whereby through said spur gears to rotate the first ring gear when said steering shaft is held to accept the driving torque reaction through said eccentric cam, said drive transmission serving to hold said other ring gear fixed when said motor is inoperative whereby to accept the drive torque reaction incidental to manual rotation of said steering shaft and cam, a member in said drive transmission mounted for slight reactive movement when said drive transmission accepts said torque reaction, and a switch for said motor actuated by said reactive movement.

7. In a combination of the class described, an epicyclic gear combination comprising a pair of independently rotatable internal ring gears and a pair of spur gears rotatable as a unit relatively to said ring gears, a steering shaft having an eccentric cam on which said pair of spur gears are rotatably mounted, steering mechanism secured relatively to one of said ring gears for actuation thereby, a motor, a drive transmission between said motor and the other of said ring gears for rotating the said ring gear whereby through said spur gears to rotate the first ring gear when said steering shaft is held to accept the driving torque reaction through said eccentric cam, said drive transmission serving to accept the drive torque reaction incidental to manual rotation of said steering shaft and cam, a member in said drive transmission mounted for slight reactive movement when said drive transmission accepts said torque reaction, and a switch for said motor actuated by said reactive movement.

8. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a motor, transmission means whereby said motor rotates the other of said ring gears including a worm in driving engagement with a worm gear rotatable with said other ring gear, a worm shaft on which said worm is formed, means mounting said worm shaft for endwise movement, and a switch means for said motor actuated by endwise movement of said worm shaft.

9. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a motor, transmission means whereby said motor rotates the other of said ring gears including a worm in driving engagement with a worm gear rotatable with said other ring gear, a worm shaft on which said worm is formed, means mounting said worm shaft for endwise movement, means holding said shaft yieldingly in a normally balanced position, and switch means for said motor actuated by endwise movement of said shaft in either direction from said balanced position.

10. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a motor, a drive transmission between said motor and the other of said ring gears for rotating the said ring gear whereby through said spur gears to rotate the first ring gear when said steering shaft is held to accept the driving torque reaction through said eccentric cam, said drive transmission including a worm in driving engagement with a worm gear rotatable with said other ring gear, said worm and worm gear serving to hold said other ring gear fixed when said motor is inoperative whereby to accept the drive torque reaction incidental to manual rotation of said steering shaft and cam, a worm shaft on which said worm is formed, means mounting said worm shaft for endwise movement, and a switch means for said motor actuated by endwise movement of said worm shaft.

11. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a motor, a drive transmission between said motor and the other of said ring gears for rotating the said ring gear whereby through said spur gears to rotate the first ring gear when said steering shaft is held to accept the driving torque reaction through said eccentric cam, said transmission including a worm in driving engagement with a worm gear rotatable with said other ring gear, said worm and worm gear serving to hold said other ring gear fixed when said motor is inoperative whereby to accept the drive torque reaction incidental to manual rotation of said steering shaft and cam, a worm shaft on which said worm is formed, means mounting said worm shaft for endwise movement, means holding said worm shaft yieldingly in a normally balanced central position, and switch means for said motor actuated by endwise movement of said shaft in either direction.

12. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a worm gear rotatable with the other of said ring gears, a worm shaft, a worm on said shaft in engagement with said worm gear, a motor, a drive between said motor and worm shaft for actuating said worm and worm gear and thereby rotating said other ring gear to rotate the first ring gear when said steering shaft is held to accept the driving torque reaction through said eccentric cam, and said worm and worm gear serving to hold said other ring gear fixed when said motor is inoperative whereby to accept the drive torque reaction incidental to manual rotation of said steering shaft and cam.

13. In a combination of the class described, an epicyclic gear combination comprising a pair of independently rotatable internal ring gears and a pair of spur gears rotatable as a unit relatively to said ring gears, a steering shaft having an eccentric cam on which said spur gears are rotatably mounted, steering mechanism secured relatively to one of said ring gears for actuation thereby, a worm gear formed on the external surface of the other of said ring gears, a worm shaft, a worm on said shaft in engagement with said worm gear, a motor, a chain drive between said motor and worm shaft for actuating said worm and worm gear and thereby rotating said other ring gear to rotate the first ring gear when said steering shaft is held to accept the driving torque reaction through said eccentric cam, said worm and gear serving to hold said other ring gear fixed when said motor is inoperative whereby to accept the drive torque reaction incidental to manual rotation of said steering shaft and cam, means mounting said worm shaft for endwise movement, means holding said shaft yieldingly in a normally balanced central position, and switch means for said motor actuated by endwise movement of said shaft in either direction.

14. In a combination of the class described, an epicyclic gear combination comprising a pair of independently rotatable internal ring gears and a pair of spur gears rotatable as a unit relatively to said ring gears, a control shaft having an eccentric cam on which said pair of spur gears are rotatably mounted, control mechanism secured relatively to one of said ring gears for actuation thereby, a motor, a drive transmission between said motor and the other of said ring gears for rotating the said ring gear whereby through said spur gears to rotate the first ring gear when said control shaft is held to accept the driving torque reaction through said eccentric cam, said drive transmission serving to accept the drive torque reaction incidental to manual rotation of said control shaft and cam, a member in said drive transmission mounted for slight reactive movement when said drive transmission accepts said torque reaction, and a switch for said motor actuated by said reactive movement.

15. In a combination of the class described, an epicyclic gear combination comprising a pair of independently rotatable internal ring gears and a pair of spur gears rotatable as a unit relatively to said ring gears, a control shaft having an eccentric cam on which said spur gears are rotatably mounted, control mechanism secured relatively to one of said ring gears for actuation thereby, a motor, transmission means whereby said motor rotates the other of said ring gears including a worm in driving engagement with a worm gear rotatable with said other ring gear, a worm shaft on which said worm is formed, means mounting said worm shaft for endwise movement, and a switch means for said motor actuated by endwise movement of said worm shaft.

16. In a combination of the class described, an epicyclic gear combination comprising a pair of independently rotatable internal ring gears and a pair of spur gears rotatable as a unit relatively to said ring gears, a control shaft having an eccentric cam on which said spur gears are rotatably mounted, control mechanism secured relatively to one of said ring gears for actuation thereby, a motor, a drive transmission between said motor and the other of said ring gears for rotating the said ring gear whereby through said spur gears to rotate the first ring gear when said control shaft is held to accept the driving torque reaction through said eccentric cam, said drive transmission including a worm in driving engagement with a worm gear rotatable with said other ring gear, said worm and worm gear serving to hold said other ring gear fixed when said motor is inoperative whereby to accept the drive torque reaction incidental to manual rotation of said control shaft and cam, a worm shaft on which said worm is formed, means mounting said worm shaft for endwise movement, and a switch means for said motor actuated by endwise movement of said worm shaft.

17. In a combination of the class described, an epicyclic gear combination comprising a pair of independently rotatable internal ring gears and a pair of spur gears rotatable as a unit relatively to said ring gears, a manually rotatable control shaft having an eccentric cam on which said spur gears are rotatably mounted, control mechanism secured relatively to one of said ring gears for actuation thereby, a worm gear rotatable with the other of said ring gears, a worm shaft, a worm on said shaft in engagement with said worm gear, a motor, a drive between said motor and worm shaft for actuating said worm and worm gear and thereby rotating said other ring gear to rotate the first ring gear when said manually rotatable control shaft is held to accept the driving torque reaction through said eccentric cam, and said worm and worm gear serving to hold said other ring gear fixed when said motor is inoperative whereby to accept the drive torque reaction incidental to manual rotation of said manually rotatable control shaft and cam.

BRONISLAUS ULINSKI.

REFERENCES CITED

The following references are of record in the file of this patent:

UNITED STATES PATENTS

| Number | Name | Date |
| --- | --- | --- |
| 1,377,306 | Brush | May 10, 1921 |
| 1,948,709 | Hackethal | Feb. 27, 1934 |
| 2,232,165 | Cochran | Feb. 18, 1941 |
| 2,250,259 | Foote | July 22, 1941 |
| 2,251,167 | Probst | July 27, 1941 |
| 2,300,343 | Clay | Oct. 27, 1942 |